United States Patent
Mumpower et al.

(10) Patent No.: US 6,769,227 B2
(45) Date of Patent: Aug. 3, 2004

(54) PACKAGE INCLUDING A LIDSTOCK LAMINATE

(75) Inventors: Edward L. Mumpower, Moore, SC (US); John R. Wolf, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 10/201,441

(22) Filed: Jul. 23, 2002

(65) Prior Publication Data

US 2004/0016208 A1 Jan. 29, 2004

(51) Int. Cl.$^7$ .............................................. B65B 61/02
(52) U.S. Cl. ....................................... 53/411; 428/36.6
(58) Field of Search ........................... 53/411; 428/349, 428/36.6, 36.7

(56) References Cited

U.S. PATENT DOCUMENTS

| | | | |
|---|---|---|---|
| 4,400,428 A | 8/1983 | Rosenthal et al. | |
| 4,421,823 A | 12/1983 | Theisen et al. | |
| 4,605,460 A | 8/1986 | Schirmer | |
| 4,755,419 A | 7/1988 | Shah | |
| 4,803,122 A | 2/1989 | Schirmer | |
| 4,971,845 A | 11/1990 | Aaker et al. | |
| 5,011,735 A | 4/1991 | Schirmer | |
| 5,089,073 A | 2/1992 | Schirmer | |
| 5,110,677 A | 5/1992 | Barmore et al. | |
| 5,353,985 A | 10/1994 | Nageli et al. | |
| 5,374,459 A | 12/1994 | Mumpower et al. | |
| 5,460,878 A | 10/1995 | Hostetter | |
| 5,462,756 A | 10/1995 | Raines et al. | |
| 5,591,468 A | 1/1997 | Stockley, III et al. | |
| 5,686,126 A | 11/1997 | Noel et al. | |
| 5,744,181 A | 4/1998 | Sornay et al. | |
| 5,779,050 A | 7/1998 | Kocher et al. | |
| 5,779,832 A | 7/1998 | Kocher | |
| 5,853,639 A | * 12/1998 | Kawakami et al. | .... 264/177.19 |
| 5,885,707 A | 3/1999 | Kaschel et al. | |
| 5,916,615 A | * 6/1999 | Brady et al. | ................. 426/129 |
| 5,919,547 A | * 7/1999 | Kocher et al. | ............... 428/138 |
| 6,013,363 A | 1/2000 | Takahashi et al. | |
| 6,032,800 A | 3/2000 | Kocher | |
| 6,033,758 A | 3/2000 | Kocher et al. | |
| 6,071,626 A | 6/2000 | Frisk | |
| 6,106,935 A | 8/2000 | Lambert et al. | |
| 6,248,380 B1 | 6/2001 | Kocher et al. | |
| 6,303,233 B1 | * 10/2001 | Amon et al. | ................. 428/516 |
| 6,333,061 B1 | 12/2001 | Vadhar | |
| 6,447,892 B1 | * 9/2002 | Hatley et al. | ................ 428/218 |

(List continued on next page.)

FOREIGN PATENT DOCUMENTS

| | | |
|---|---|---|
| EP | 721899 | 7/1996 |
| WO | 95/00333 | 1/1995 |
| WO | 98/22282 | 5/1998 |
| WO | 98/23443 | 6/1998 |
| WO | 98/23500 | 6/1998 |
| WO | 99/33653 | 12/1998 |
| WO | 99/58329 | 11/1999 |
| WO | 01/26897 | 4/2001 |
| WO | 01/89830 | 11/2001 |

*Primary Examiner*—Rinaldi I. Rada
*Assistant Examiner*—Gloria Weeks
(74) *Attorney, Agent, or Firm*—Daniel B. Ruble

(57) ABSTRACT

A method of forming a package by heat sealing a trap-printed laminate to a support member (e.g., tray). The laminate has a free shrink in each of the transverse and machine directions of at least about 10% at 200° F. and at least about 21% at 240° F. The laminate has an oxygen transmission rate of no more than about 100 cubic centimeters. The outside layer of the laminate comprises at least about 40% of one or more relatively high-melt polymers each having a melting point at least about 25° F. higher than the lowest melting point polymer of the sealant layer. The first film has an oxygen transmission rate greater than the oxygen transmission rate of the second film.

28 Claims, 2 Drawing Sheets

U.S. PATENT DOCUMENTS

| | | |
|---|---|---|
| 6,455,150 B1 * | 9/2002 | Sheppard et al. ............ 428/327 |
| 6,503,549 B1 * | 1/2003 | Mueller ....................... 426/396 |
| 6,528,127 B1 * | 3/2003 | Edlein et al. ................ 427/494 |
| 6,534,137 B1 | 3/2003 | Vadhar |
| 6,562,443 B1 * | 5/2003 | Espinel et al. ............... 428/213 |
| 6,579,621 B1 * | 6/2003 | Shah ........................... 428/516 |
| 6,602,590 B2 * | 8/2003 | Ting et al. ................... 428/218 |
| 6,627,273 B2 | 9/2003 | Wolf et al. |

\* cited by examiner

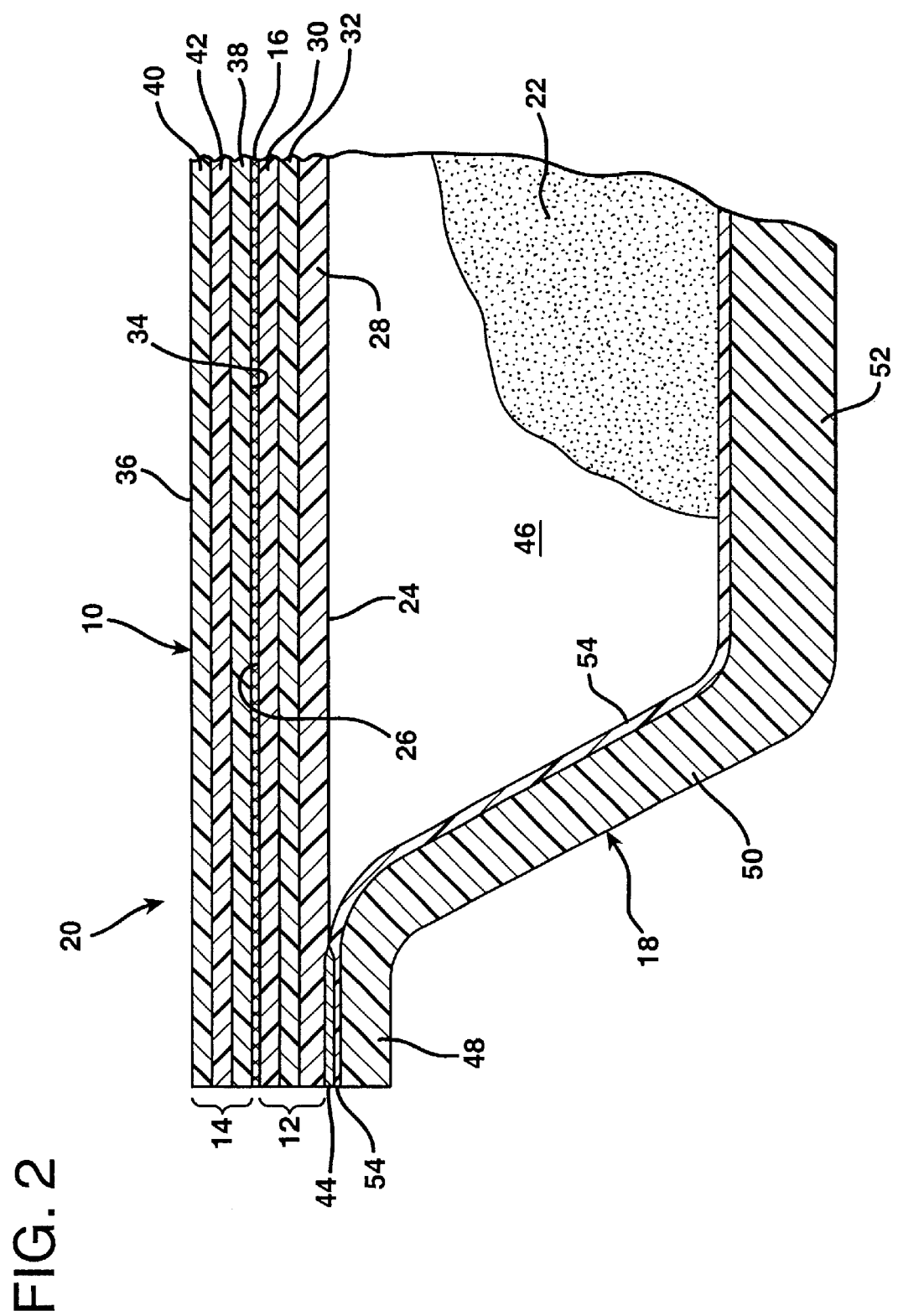

PACKAGE INCLUDING A LIDSTOCK LAMINATE

BACKGROUND OF THE INVENTION

The present invention relates to a packaging film, and more particularly to a laminate useful as a lidstock for sealing a tray closed.

It is common in food packaging operations for a food product, such as fresh meat, to be placed on a tray, such as a thermoformed expanded polystyrene tray having a central depressed area and a surrounding peripheral flange. A thermoplastic film or laminate may then be positioned over the food and heat sealed to the peripheral flange to hermetically enclose the food product. In such arrangement, the thermoplastic film or laminate is the "lid" or "lidstock" and the tray is a "support member."

The lidstock should be capable of forming a strong, hermetic seal with the support member. This is true even where the sealing area of the tray may be exposed or contaminated with by-product (e.g., meat purge) from the packaged food. This is also true where, as is commonly the case, the support member is relatively rigid. Heat sealing a flexible lidstock to a rigid support member is more challenging than heat sealing the flexible lidstock to either another flexible film or laminate or to itself (for example, in a fin seal arrangement commonly used in vertical form-fill-seal operations).

To heat seal the lid to the support member, a heated bar engages the outside of the lid to compress it against the flange of the support member. In so doing, heat transfers from the heated bar to the outside of the lid, through the thickness of the lid, to the inside sealant layer of the lid, and to the flange of the support member. The resulting heat and compression causes the contacting surfaces of the lid and support member to become molten and to intermix with one another. The heating bar is then removed to allow the sealed area to cool and form a sealed bond.

The heat from the heat seal process may also cause a heat-shrinkable lidstock to shrink or create a shrink tension in the areas of the lidstock that have been exposed to a sufficient amount of heat for a sufficient amount of time to effect a shrink.

The seal strength of the resulting sealed package may be determined by several methods. The support member may be pierced with an inflation needle and the interior of the sealed package may then be inflated until the lid or seal between the lid and support member fails. A higher internal inflation pressure at failure indicates a stronger seal strength. Alternatively, the sealed package may be placed in a vacuum chamber and subjected to decreasing external pressures until failure—a lower external pressure at failure indicating a stronger seal strength. Also, a representative sample of the seal may be cut from the sealed package (or formed separately) so that the lidstock may be pulled from the support member, for example, using an Instron tensile tester under specified conditions. A higher maximum force attained before failure indicates a stronger seal strength.

In all of these tests of seal strength, the failure mechanism may occur in one or more of several ways. In each case, the failure mode seeks a failure path requiring the least amount of force. For example, the bond between the lidstock and the support member may fail adhesively so that the lidstock simply peels away from the support member. Or, the lidstock may fail cohesively along a path cutting generally perpendicularly through one or more layers of the lidstock—and then fail adhesively along the interface between two layers of the lidstock. The failure path may combine an intricate path of cohesive and adhesive failures—all while the lidstock is being stretched by the applied force—to present a complicated failure mode.

The above discussion is made to establish that a weaker cohesive strength within a layer of the lidstock and/or a weaker adhesive bond strength between layers of the lidstock may weaken the seal strength of the sealed package. This is especially true where the seal strength failure mode is not simply the peeling of the lidstock from the support member by adhesive failure of the sealing bond between the lid and the support member.

A desirable lidstock provides gas (e.g., oxygen, carbon dioxide) barrier attributes sufficient to enhance the storage life of the packaged food. The barrier characteristics of the lidstock may have increased importance where the interior atmosphere of the package may be modified, for example, to decrease the concentration of oxygen from that of ambient air or to increase the concentration of oxygen and carbon dioxide from that of ambient air. For example, in packaging meat, the atmosphere in the sealed package may comprise about 80% by volume oxygen and about 20% by volume carbon dioxide in order to inhibit the growth of harmful microorganisms and extend the time period in which the meat retains its attractive red ("bloom") coloration. Oxygen and carbon dioxide barrier attributes may be imparted to a film by incorporating, for example as a film layer, one or more resins having low permeability to oxygen. (Since carbon dioxide barrier properties generally correlate with oxygen barrier properties, only oxygen barrier properties are discussed in detail herein.)

It is not unusual for the inter-layer bond strengths associated with the incorporation of barrier resins or barrier layers into a lidstock to be weaker than the inter-layer bond strengths that would be present if the barrier resin or layer were absent. That is to say, the inter-layer bond strength between a barrier layer and an adjacent layer is usually the weakest inter-layer bond strength of a film. It is also possible that weaker inter-layer bond strengths may be associated with one or more "tie layers" that may accompany the use of a barrier layer. Although a tie layer may be inserted between the barrier layer and an otherwise adjacent film layer in order to improve the inter-layer bond adhesion, the resulting bond strength between the tie layer and its adjacent film layer may be less than the bond strength between the tie layer and its adjacent barrier layer. Accordingly, the tie layer may present the weakest inter-layer bond strength of the lidstock—and thus present the failure path during a seal strength test.

In order to produce packaged product at a fast (and therefore economical) rate, the lidstock should be capable of being quickly heat sealed to the support member. A lidstock that facilitates quick heat sealing is said to have good "sealability."

It is also desirable for the lidstock to be printed. Such printing provides important information to the end-user of the packaged food—information such as the ingredients of the packaged food, the nutritional content, package opening instructions, food handling and preparation instructions, and food storage instructions. The printing may also provide a pleasing image and/or trademark or other advertising information to enhance the retail sale of the packaged product.

Such printed information may be placed on the outside surface of the lidstock. However, such surface printing is directly exposed to a heated bar during the heat seal operation that seals the lid to the support member. As a result, the surface printing may become smeared or otherwise degraded. A surface printing is also exposed to other physical abuses during distribution and display of the packaged product. Such abuse may also degrade the clarity and presentation of the printed image.

Once the lidstock has been sealed to a support member to form a closed package, it is also desirable that the lidstock not appear wrinkled or wavy. Such wrinkles or waves tend to form in the corner areas of a sealed lidstock—and may appear even if the sealed lidstock forms a tight, "drum-like" lid for the support member. The wrinkles may also appear as relatively small film corrugations near the sealed area of the lid, in particular at the leading and trailing ends (relative to the machine direction) of the package. Such wrinkles or waves cause the package to present a less than desirable appearance to the customer.

SUMMARY OF THE INVENTION

The present invention addresses one or more of the aforementioned problems. A laminate is provided that comprises a first film having an inside surface and an outside surface opposite the inside surface of the first film. The first film comprises a sealant layer forming the inside surface of the first film. The sealant layer comprises one or more polymers each having a given melting point. At least one polymer of the sealant layer has the lowest melting point of the one or more polymers in the sealant layer. The laminate also comprises a second film having an inside surface and an outside surface opposite the inside surface. The second film comprises an outside layer forming the outside surface of the second film. The outside layer comprises at least about 40% by weight of the outside layer of one or more relatively high-melt polymers each having a melting point at least about 25° F. higher than the lowest melting point polymer of the sealant layer. The laminate also includes a printed image between the first and second films. The first film has an oxygen transmission rate greater than the oxygen transmission rate of the second film, measured (at standard temperature and pressure) per square meter per day per 1 atmosphere of oxygen pressure differential measured at 0% relative humidity and 23° C. The laminate has an oxygen transmission rate of no more than about 100 cubic centimeters (at standard temperature and pressure) per square meter per day per 1 atmosphere of oxygen pressure differential measured at 0% relative humidity and 23° C. The laminate has a free shrink in each of the transverse and machine directions of at least about 10% at 200° F. and at least about 21% at 240° F. The laminate is heat sealed to a support member to form a closed package.

Heat sealing a laminate to a support member (e.g., tray) where the laminate has the recited free shrinks at both 200° F. and 240° F. reduces the amount and size of wrinkles (e.g., lid corrugations near the sealing area) and/or waves that may otherwise form in the lid of the resulting sealed package.

The laminate may provide enhanced seal strength relative to laminates having a barrier layer as an inner layer of the sealant film of the laminate. It is believed that a barrier layer often presents a weaker inter-layer bond strength relative to the inter-layer bond strengths of the other layers. When a packaging seal fails, it is typically because of a delamination between layers having the weakest inter-layer bond strength within a film of the laminate.

By placing the barrier layer in the outside film of the laminate, the relatively weaker inter-layer bond strength may be positioned farther from the bond between the laminate and the support member. When such potential inter-layer failure is farther from the inside (i.e., food-side) of the laminate, the failure tear propagation (i.e., the path of inter-film cohesive failure) must travel farther to reach the "weakest link" inter-layer delamination path. This farther distance in the present invention is believed to enhance the seal strength.

Further, the placement of barrier components in the outside film of the laminate may allow for greater flexibility in manufacturing the lidstock laminate. This is because the inside sealant film may be manufactured without the additional restriction associated with accommodating barrier components in a coextruded, oriented film. For example, the extrusion of a barrier layer often requires higher temperatures than those needed to extrude the other layers of the film. This higher temperature associated with a barrier layer may limit the amount of lower melting point materials that can be used in the film—otherwise, the film may flow too easily and the melt strength may be lowered to an unacceptable level for processing. Also, the orientation of a film having a barrier layer may require a higher orientation temperature, which can soften lower melting point materials in the film to an unacceptable level, causing an unstable orientation or welding together of adjacent layers. Thus, the incorporation of the barrier components in the outside film allows greater choices in imparting the desired shrink and other attributes to the inside, sealant film of the laminate.

The laminate may incorporate a trap print arrangement, which enhances the protection of the printed image of the laminate during the heat seal process that seals the laminate to a support member.

The laminate provides a low rate of oxygen transmission, which enables the atmosphere within the sealed package to be modified to extend the shelf life and bloom "color life" of a packaged red meat product. The laminate also provides excellent print quality and optical clarity.

The laminate can provide excellent sealability to a support member. This allows a packager to run the heat sealing machine at a fast rate while also providing good seal strength between the laminate and the tray. The resulting seal between the laminate and the tray may provide excellent strength even where the seal is formed in the presence of contaminants and under variable heat sealing temperatures.

These and other objects, advantages, and features of the invention will be more readily understood and appreciated by reference to the detailed description of the invention and the drawings.

BRIEF DESCRIPTION OF THE DRAWINGS

FIG. 2 is a fragmentary, representational sectional view of the inventive laminate and sealed package of the present invention.

DETAILED DESCRIPTION OF THE INVENTION

Figure 1:
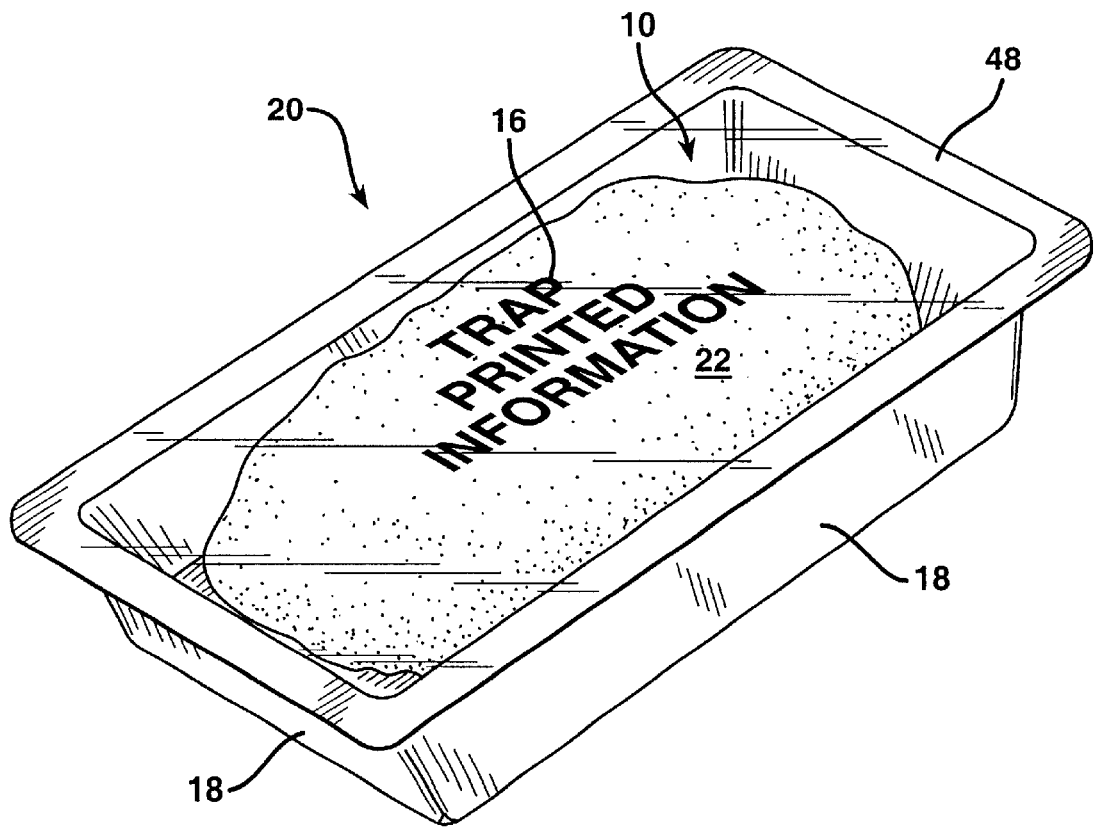
FIG. 1 is a perspective view of the sealed package of the present invention.

The inventive laminate 10 comprises sealant film 12 laminated to barrier film 14 to trap print image 16 between the sealant and barrier films. Sealant film 12 may be monolayer, two-layer, or have three or more layers (as shown in FIG. 1). Also, barrier film 14 may be monolayer, two-layer, or have three or more layers (as shown in FIG. 1). The laminate 10 may be sealed to support member 18 (e.g., a tray) to form sealed package 20 enclosing, for example, food product 22.

SEALANT FILM

The sealant film 12 defines an inside (i.e., food side) surface 24 and an outside surface 26 opposite the inside surface. The polymer material (i.e., component or blend of components) that forms the inside surface 24 of the sealant film has a melting point that facilitates heat sealing the laminate 10 to a support member 18. If the sealant film is monolayer, then it may have the composition, attributes, and physical characteristics as discussed in conjunction with the Sealant Layer section below.

The sealant film 12 may have any total thickness as long as it provides the desired properties (e.g., flexibility, Young's modulus, optics, strength) for the given packaging application of expected use. The sealant film may have a thickness of less than about any of the following: 10 mils, 5 mils, 4 mils, 3 mils, 2 mils, 1.5 mils, 1.4 mils, 1.3 mils, 1.2 mils, 1.1 mils, and 1 mil. (A "mil" is equal to 0.001 inch.) The sealant film may also have a thickness of at least about any of the following: 0.3 mils, 0.4 mils, 0.5 mils, 0.6 mils, 0.7 mils, 0.75 mils, 0.8 mils, 0.9 mils, 1 mil, 1.2 mil, 1.4 mil, and 1.5 mil. The sealant film may have a thickness of at least about any of the following percentages of the thickness of the barrier film: 50%, 60%, 70%, 80%, 90%, 100%, 110%, 120%, 130%, 140%, 150%, 160%, and 175%. For example, the thickness of the sealant film may be greater than or equal to the thickness of the barrier film.

The sealant film 12 may be relatively permeable to oxygen relative to the barrier film 14 discussed below. For example, the sealant film 12 may have an oxygen transmission rate higher than that of the barrier film 14 by at least about any of the following: 50, 75, 100, 200, 500, and 1,000 cubic centimeters (at standard temperature and pressure) per square meter per day per 1 atmosphere of oxygen pressure differential measured at 0% relative humidity and 23° C., measured according to ASTM D-3985. Also, the sealant film 12 may have an oxygen transmission rate of at least about any of the following: 110, 200, 500, 1,000, 2,000, 3,000, 5,000, 10,000, 15,000, 20,000, and 50,000 cubic centimeters (at standard temperature and pressure) per square meter per day per 1 atmosphere of oxygen pressure differential measured at 0% relative humidity and 23° C., measured according to ASTM D-3985.

The sealant film 12 has a heat-shrinkable attribute. For example, the sealant film 12 may have a free shrink measured at 200° F. in at least one direction (i.e., machine or transverse direction), in at least each of two directions (machine and transverse directions), or a total free shrink of at least about any of the following values: 5%, 7%, 10%, 15%, 20%, 30%, 40%, 50%, and 60%. Also, sealant film 12 may have a free shrink measured at 240° F. in at least one direction (machine or transverse directions), in each of at least two directions (machine and transverse directions), or a total free shrink measured of at least about any of the following values: 7%, 10%, 15%, 20%, 25%, 30%, 40%, 50%, 55%, 60%, 65%, and 70%.

As is known in the art, the total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%.

Unless otherwise indicated, each reference to free shrink in this application means a free shrink determined by measuring the percent dimensional change in a 10 cm×10 cm specimen when subjected to selected heat (i.e., at a certain temperature exposure) according to ASTM D 2732. Also, a reference herein to the shrink attributes of a film that is a component of a laminate refers to the shrink attributes of the film itself, which can be measured by separating the film from the laminate—for example, by using an appropriate solvent to dissolve the adhesive that bonds the films together to form the laminate.

The sealant or first film 12 is preferably multilayer (i.e., includes two or more layers) so that the layers in combination impart the desired performance characteristics to the sealant film. The sealant film 12 may, for example, comprise from 2 to 15 layers, at least 3 layers, at least 4 layers, at least 5 layers, from 2 to 4 layers, from 2 to 5 layers, and from 5 to 9 layers. As used herein, the term "layer" refers to a discrete film component which is coextensive with the film and has a substantially uniform composition.

A multilayer sealant film includes a sealant layer 28 forming the food-side or inside surface and a skin or print-side layer 30 forming the outside or non-food surface of the sealant film. The multilayer sealant film may also include one or more additional layers 32, such as core, bulk, and tie layers, although the sealant film may have a composition such that tie layers are not incorporated in the sealant film.

Below are some examples of combinations in which the alphabetical symbols designate the resin layers. Where the multilayer sealant film representation below includes the same letter more than once, each occurrence of the letter may represent the same composition or a different composition within the class that performs a similar function.

```
A/D, A/C/D, A/B/D, A/B/C/D, A/C/B/D, A/B/B/D, A/C/B/C/D, A/B/B/B/D, A/B/C/B/D,
A/C/B/B/D, A/C/B/B/C/D, A/B/C/B/C/D, A/C/B/C/B/D, A/B/C/B/B/D, A/C/B/B/B/D,
A/C/B/C/B/D, A/C/B/B/C/D
```

"A" is the sealant layer (heat seal layer), as discussed below.
"B" is a core or bulk layer, as discussed below.
"C" is a tie layer, as discussed below.
"D" is an skin or print-side layer, as discussed below.

Sealant Layer of the Sealant Film

Sealant layer 28 forms the inside surface 24 of the laminate 10. Sealant layer 28 facilitates the heat-sealing of laminate 10 to another object, such as a support member or tray 18. The sealant layer preferably includes selected components having a melt or softening point lower than that of the components of the other layers of the sealant film. The sealant layer may comprise a resin having a Vicat softening temperature of less than about any of the following values: 120° C., 115° C., 110° C., 105° C., 100° C., 95° C., and 90° C. The sealant layer may include one or more polymers having a melt-flow index of at least about any of the following: 1, 1.2, 1.4, 1.6, 1.8, 2, 2.2, 2.5, 2.8, 3, 3.5, 4, 5, 6, 7, 8, 9, 10, 15, and 20. The sealant layer may include one or more polymers having a melting point of less than about any of the following: 130° C., 125° C., 120° C., 115° C., 112° C., 110° C., 108° C., 105° C., 103° C., 100° C., 98° C., and 95° C., in an amount of at least about any of the following percentages (based on the weight of the sealant layer): 30, 40, 50, 60, 70, 80, 90, and 100.

All references to "Vicat" values in this application are measured according to ASTM 1525 (1 kg). All references to melt-flow index in this application are measured according to ASTM D1238, at a temperature and piston weight as specified according to the material as set forth in the ASTM test method. All references to the melting point of a polymer or resin in this application refers to the melting peak temperature of the dominant melting phase of the polymer or resin as determined by differential scanning calorimetry according to ASTM D-3418.

The sealant layer may include one or more thermoplastic polymers including polyolefins, polystyrenes, polyurethanes, polyamides, polyesters, polyvinyl chlorides, and ionomers.

Useful polyolefins include ethylene homo- and co-polymers and propylene homo- and co-polymers. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth)acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. Preferably, the comonomer includes one or more $C_3$–$C_{20}$ α-olefins, more preferably one or more $C_4$–$C_{12}$ α-olefins, and most preferably one or more $C_4$–$C_8$ α-olefins. Particularly preferred α-olefins include 1-butene, 1-hexene, 1-octene, and mixtures thereof.

EAOs include one or more of the following: 1) medium density polyethylene ("MDPE"), for example having a density of from 0.93 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler Natta catalysts.

On the other hand, homogeneous polymers are typically prepared using metallocene or other single site-type catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/ alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/ unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth) acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth) acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/ methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes propylene/ethylene copolymers ("EPC"), which are copolymers of propylene and ethylene having a majority weight % content of propylene, such as those having an ethylene comonomer content of less than 10%, preferably less than 6%, and more preferably from about 2% to 6% by weight.

Useful polyesters and polyamides include those described in this application below.

Ionomer is a copolymer of ethylene and an ethylenically unsaturated monocarboxylic acid having the carboxylic acid groups partially neutralized by a metal ion, such as sodium or zinc, preferably zinc. Useful ionomers include those in which sufficient metal ion is present to neutralize from about 15% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

The sealant layer 28 may have a composition such that any one of the above described polymers comprises at least about any of the following weight percent values: 30, 40, 45, 50, 55, 60, 65, 70, 75, 80, 85, 90, 95, and 100% by weight of the layer.

The thickness of the sealant layer is selected to provide sufficient material to effect a strong heat seal bond, yet not so thick so as to negatively affect the manufacture (i.e., extrusion) of the sealant film by lowering the melt strength of the film to an unacceptable level. The sealant layer may have a thickness of at least about any of the following values: 0.2 mils, 0.25 mils, 0.3 mils, 0.35 mils, 0.4 mils, 0.45 mils, 0.5 mils, and 0.6 mils. The sealant layer may have a thickness ranging from about 0.05 to about 6 mils, more preferably from about 0.1 to about 2 mils, and still more preferably from about 0.2 to about 0.5 mils. Further, the thickness of the sealant layer as a percentage of the total thickness of the sealant film may range (in ascending order of preference) from about 1 to about 50 percent, from about 5 to about 45 percent, from about 10 to about 45 percent, from about 15 to about 40 percent, from about 15 to about 35 percent, and from about 15 to about 30 percent. The sealant layer may have a thickness relative to the thickness of the sealant film of at least about any of the following values: 15%, 20%, 30%, 40%, and 50%.

Skin Layer of the Sealant Film

The skin layer 30 of the sealant film may provide the surface upon which a printed image (e.g., printed information) is applied, in which case the layer is preferably capable of providing a surface that is compatible with the selected print ink system. Further, the skin layer 30 provides the outside surface 26 to which the barrier film 14 may be directly laminated, as discussed in more detail below.

The skin layer 30 may include any of the thermoplastics or compositions as discussed above in conjunction with the sealant layer 28. The skin layer 30 may have a composition or thickness (or both) substantially similar to the sealant layer 28; or, the skin layer 30 may have a thickness and/or composition different from the sealant layer 28. For example, the skin layer 30 may comprise one or more polymers having a melting point higher than the melting point of the lowest melting point polymer of the sealant layer 28 by at least about any of the following values: 3° F., 5° F., 7° F., 10° F., 15° F., 20° F., 25° F., 30° F., and 35° F. The one or more higher melting point polymers of the skin layer may comprise a weight percentage of the skin layer of at least about any of the following values: 30, 40, 50, 60, 70, 75, 80, 85, 90, 95%.

Further, the one or more polymers of the skin layer 30 having a lowest melting point of the polymers of the skin layer may also have a melting point higher than the one or more polymers of the sealant layer 38 having a lowest melting point of the polymers of the sealant layer. For example, the lowest melting point polymer of the skin layer may have a melting point higher by at least about any of the following values: 3° F., 5° F., 7° F., 10° F., 15° F., 20° F., 25° F., 30° F., and 35° F. This differential in melting point values generally results in the skin layer 30 having lower tackiness than the sealant layer 28, since a higher melting point polymer generally has less tackiness than a lower melting point polymer. As a result, the manufacture of the sealant film may be facilitated, because the sealant film is less likely to stick to itself when wound into a roll—and less likely to cause a reduction in processing speeds by sticking to processing equipment.

The skin layer 30 may include one or more of any of the above-described polymers, for example, polyamides, polyethylene, and/or polypropylene, either alone or in combination. The skin layer 30 may have a composition such that any one of the above-described polymers comprises at least about any of the following weight percent values: 30, 40, 45, 50, 55, 60, 65, 70, 75, 80, 85, 90, 95, and 100% by weight of the layer.

The skin layer may have a thickness of from about 0.05 to about 5 mils, preferably from about 0.2 to about 2 mils, and more preferably from about 0.2 to about 0.5 mils. The thickness of the skin layer may range as a percentage of the total thickness of the sealant film of from about (in ascending order of preference) 1 to 50 percent, 3 to 45 percent, 5 to 40 percent, 7 to 35 percent, and 7 to 30 percent. Useful thicknesses for the skin layer include at least about any of the following values: 0.1 mils, 0.15 mils, 0.2 mils, and 0.25 mils.

Additional Layers of the Sealant Film

The sealant film 12 may include one or more additional layers 32, such as a tie, core, or bulk layers. A tie layer is an inner film layer having the primary purpose of adhering two layers of a film together. The tie layers, if present in the sealant film, may have the composition and other attributes as described below in conjunction with the tie layers of barrier film 14. The adjacent layers of a multiple layer sealant film 12 may have sufficient compatibility so that a tie layer is not needed to form a inter-layer bond strength that is sufficiently strong for the expected end use.

A core or bulk layer may be an inner film layer having a primary purpose other than as a barrier or tie layer—for example, serving to provide a multilayer film with a desired level of strength, modulus, or optics. A core or bulk layer may include one or more of the polymers and/or have a composition as described above in the Sealant Layer section with respect to the sealant layer.

Each of the additional layers 32 may have a thickness of from about 0.05 to about 5 mils, preferably from about 0.1 to about 2 mils, and more preferably from about 0.2 to about 0.5 mils. The thickness of an additional layer may range as a percentage of the total thickness of the sealant film of from about (in ascending order of preference) 1 to 80 percent, 3 to 50 percent, 5 to 40 percent, 7 to 35 percent, and 7 to 30 percent. Preferably, adjacent film layers have different compositions.

Carrier Film

The barrier film 14 defines an inside surface 34 and an outside surface 36 opposite the inside surface. The outside surface 36 of the barrier film 14 forms the surface that may engage the heated bar of a heat-sealing device (not shown) used in sealing laminate 10 to support member 18, as discussed in more detail below. The outside layer 40 forms the outside surface 36 of the barrier film.

The barrier film 14 may have any total thickness as long as it provides the desired properties (e.g., flexibility, Young's modulus, optics, strength, barrier) for the given packaging application of expected use. The barrier film may have a thickness of less than about any of the following: 10 mils, 5 mils, 4 mils, 3 mils, 2 mils, 1.5 mils, 1.2 mils, and 1.1 mils. The barrier film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, and 1.5 mils.

The barrier film 14 preferably has a composition that imparts oxygen barrier attributes to the barrier film. Examples of the components that are useful in imparting decreased oxygen barrier properties to the film (i.e., "barrier components") are discussed below in the Barrier Layer section. If the barrier film 14 is multilayer, then the one or more layers of the film that incorporate barrier components sufficient to decrease the oxygen permeability of the film are considered "barrier layers." If the barrier film is monolayer, then the barrier components may be incorporated in the sole layer of the barrier film, in which case the monolayer barrier film itself would be considered the "barrier layer." In such case, the barrier layer may also provide one or more additional functions, such as the inside, outside (abuse), bulk, and/or core layers of the barrier film. Accordingly, if the barrier film 14 is monolayer, then it may have the composition, attributes, and physical characteristics as discussed in conjunction with any of the Barrier Layer, Abuse Layer, or Inside Layer sections below.

Useful oxygen transmission rates for the barrier film 14 and laminate 10 are discussed below in the Barrier Layer section.

The barrier film 14 has a heat-shrinkable attribute. For example, the barrier film 14 may have a free shrink measured at 200° F. in at least one direction (i.e., machine or transverse direction), in at least each of two directions (machine and transverse directions), or a total free shrink of at least about any of the following values: 5%, 7%, 10%, 15%, 20%, 30%, 40%, 50%, and 60%. Also, barrier film 14 may have a free shrink measured at 240° F. in at least one direction (machine or transverse directions), in each of at least two directions (machine and transverse directions), or a total free shrink measured of at least about any of the following values: 7%, 10%, 15%, 20%, 25%, 30%, 40%, 50%, 55%, 60%, 65%, and 70%.

The ratio of free shrink of the barrier film 14 to the free shrink of the sealant film 12, measured at the same temperature and in the same direction, may be calculated for shrink temperatures of 200° F. and 240° F. in each of the machine and transverse directions. Each of the resulting ratios may be at least about any of the following values: 0.3, 0.4, 0.5, 0.6, and 0.75—and at most about any of the following values: 3, 2.5, 2, 1.8, and 1.5. It is believed that heat sealing a laminate to a support member (e.g., tray) where the laminate comprises first and second films with free shrinks within these ranges of ratios reduces the amount and size of wrinkles and/or waves that may otherwise form in the lid of the resulting sealed package.

The barrier film 14 comprises one or more polymers forming the outside surface 36, where the one or more polymers may have a melting point greater than that of the lowest melting point polymer of the sealant layer 28—for example, greater by at least about any of the following values: 25° F., 30° F., 40° F., 50° F., 65° F., 70° F., 80° F., 90° F., and 100° F. Further, outside layer 40 may comprise one or more polymers having a melting point greater than that of the lowest melting point polymer of the sealant layer 28—for example, greater by at least about any of the following values: 25° F., 30° F., 40° F., 50° F., 65° F., 70° F., 80° F., 90° F., and 100° F. The lowest melting point polymer of the outside layer 40 may have a melting point higher than the lowest melting point polymer of the sealant layer 28, for example, higher by at least about any of the following values: 25° F., 30° F., 40° F., 50° F., 65° F., 70° F., 80° F., 90° F., and 100° F. The amount of the one or more polymers of the outside layer 40 having either: 1) a melting point greater than that of the lowest melting point polymer of the sealant layer 28 or 2) having the lowest melting point of the outside layer 40 may comprise a weight percentage of the outside layer 40 of at least about any of the following values: 40, 50, 60, 70, 75, 80, 85, 90, 95%, 100%.

The barrier or second film 14 is preferably multilayer so that the layers in combination impart the desired performance characteristics to the barrier film. The barrier film 14 may comprise multiple layers, for example 2 layers, from 2 to 15 layers, 3 layers, at least 3 layers, at least 4 layers, at least 5 layers, from 2 to 4 layers, from 2 to 5 layers, and from 5 to 9 layers.

A multilayer barrier film includes: i) an inside layer 38 forming the inside surface 34 of the barrier film—a layer that upon lamination is proximate the outside layer 26 of the sealant film 12 and ii) an abuse or outside layer 40 forming the outside surface 36 of the barrier film 14. The inside layer 38 may be directly adhered to the outside layer 40. Alternatively, one or more inner layers 42, such as barrier, tie, core, and bulk layers, may exist between the inside layer 38 and the outside layer 40. Further, a barrier layer may be directly adhered to outside layer 40. The barrier layer may be a coated barrier layer, that is, a barrier layer formed by coating onto to another layer, for example, directly coated onto the inside surface of abuse layer 40 or as an exterior layer of the barrier film.

Below are some examples of layer combinations for the multiple layer barrier film 14 in which the alphabetical symbols designate the resin layers. Where the multilayer barrier film representation below includes the same letter more than once, each occurrence of the letter may represent the same composition or a different composition within the class that performs a similar function.

E/G, G/F, E/G/F, E/C/G, G/C/F, E/B/G, G/B/F, E/G/C/F, E/C/G/F, E/C/G/C/F, E/C/B/G/B/F, E/C/B/G, G/C/B/F, E/C/B/G/B/C/F

"B" is a core or bulk layer, as discussed above with respect to the sealant film.

"C" is a tie layer, as discussed below.

"E" is the inside layer of the barrier film, as discussed below. (If "E" is not present, then the first letter represents the inside layer, for example if "G" is the first letter, then the inside layer is also a barrier layer. Layer "E" may comprise any of the thermoplastics or compositions discussed above in the Sealant Layer section.)

"F" is an outside or abuse layer of the barrier film, as discussed below. (If "F" is not present, then the last letter represents the outside layer, for example if "G" is the last letter, then the outside, abuse layer is also a barrier layer.

Layer "F" may comprise any of the thermoplastics or compositions discussed above in the Sealant Layer section.) "G" is a barrier layer, as discussed below.

Barrier Layer of the Barrier Film

The barrier film 14 may include one or more barrier layers, which incorporate one or more components ("barrier components") that markedly decrease the oxygen transmission rate through the layer and thus the film incorporating such layer. Accordingly, the barrier layer of the film that is utilized in a lidstock laminate incorporated in a package may either help to exclude oxygen from the interior of the package—or to maintain oxygen within the package.

Useful barrier components include: ethylene/vinyl alcohol copolymer ("EVOH"), polyvinyl alcohol ("PVOH"), vinylidene chloride polymers ("PVdC"), polyalkylene carbonate, polyester (e.g., PET, PEN), polyacrylonitrile ("PAN"), and polyamide.

EVOH may have an ethylene content of between about 20% and 40%, preferably between about 25% and 35%, more preferably about 32% by weight. EVOH may include saponified or hydrolyzed ethylene/vinyl acetate copolymers, such as those having a degree of hydrolysis of at least 50%, preferably of at least 85%.

Vinylidene chloride polymer ("PVdC") refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$–$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/ methyl acrylate copolymer, vinylidene chloride/ethyl acrylate copolymer, vinylidene chloride/ethyl methaerylate copolymer, vinylidene chloride/methyl methacrylate copolymer, vinylidene chloride/butyl acrylate copolymer, vinylidene chloride/styrene copolymer, vinylidene chloride/ acrylonitrile copolymer, and vinylidene chloride/vinyl acetate copolymer.

Useful PVdC includes that having between 75 and 95 weight % vinylidene chloride monomer. Useful PVdC includes that having from about 5 to about 25 weight %, from about 10 to about 22 weight %, and from about 15 to about 20 weight % comonomer with the vinylidene chloride monomer. Useful PVdC includes that having a weight-average molecular weight ($M_w$) of at least 80,000, such as at least 90,000, at least 100,000, at least 111,000, at least 120,000, at least 150,000, and at least 180,000; and between 80,000 and 180,000, such as between 90,000 and 170,000, between 100,000 and 160,000, between 111,000 and 150,000, and between 120,000 and 140,000. Useful PVdC also includes that having a viscosity-average molecular weight ($M_z$) of at least 130,000, such as at least 150,000, at least 170,000, at least 200,000, at least 250,000, and at least 300,000; and between 130,000 and 300,000, such as between 150,000 and 270,000, between 170,000 and 250,000, and between 190,000 and 240,000.

A barrier layer that includes PVdC may also include a thermal stabilizer (e.g., a hydrogen chloride scavenger such as epoxidized soybean oil) and a lubricating processing aid (e.g., one or more acrylates).

Useful polyamides include polyamide 6, polyamide 9, polyamide 10, polyamide 11, polyamide 12, polyamide 66, polyamide 610, polyamide 612, polyamide 6I, polyamide 6T, polyamide 69, copolymers made from any of the monomers used to make two or more of the foregoing homopolymers (e.g., copolyamide 6/12, polyamide 12, copolyamide 66/69/6I, copolyamide 66/610, copolyamide 6/66, and copolyamide 6/69), and blends of any of the foregoing homo- and/or copolymers. Polyamide copolymers include: (a) copolyamide 6/12 comprising (i) caprolactam mer in an amount of from about 20 to 80 weight percent (preferably 30 to 70 weight percent, more preferably 40 to 60 weight percent), and (ii) laurolactam mer in an amount of from about 80 to 20 weight percent; and (b) copolyamide 66/69/6I comprising 10 to 50 weight percent hexamethylene adipamide mer (preferably from about 20 to 40 weight percent), 10 to 50 weight percent polyamide 69 mer (preferably from about 20 to 40 weight percent), and 10 to 60 weight percent hexamethylene isophthalamide mer (preferably, from about 10 to 40 weight percent).

Useful polyesters include those described in the Abuse Layer section below.

A barrier layer preferably has a thickness and composition sufficient to impart either to barrier film 14 or to laminate 10 incorporating the barrier film an oxygen transmission rate of no more than about any of the following values: 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985. (A reference to the oxygen transmission attributes of a film that is a component of a laminate refers to the oxygen transmission attributes of the film itself, which can be measured by separating the film from the laminate—for example, by using an appropriate solvent to dissolve the adhesive that bonds the films together to form the laminate.)

A barrier layer may also be formed from a latex emulsion coating grade of vinylidene chloride/vinyl chloride copolymer having 5–15% vinyl chloride. The coating grade copolymer of vinylidene chloride/vinyl chloride may be present in an amount of from 5–100% (of total solids) with the remainder being 2–10% epoxy resin and melt extrusion grade material.

The barrier layer may comprise barrier component in an amount of at least about any of the following: 50%, 60%, 70%, 80%, 90%, and 100%, based on the weight of the barrier layer. The barrier layer thickness may range from about any of the following: about 0.05 to about 6 mils, about 0.05 to about 4 mils, about 0.1 to about 3 mils, and about 0.12 to 2 mils.

Abuse Layer of the Barrier Film

The barrier film 14 may be exposed to environmental stresses, for example once the barrier film is incorporated into laminate 10 and formed into a package 20. Such environmental stresses include abrasion and other abuse during processing and shipment. The outside or abuse layer 40 preferably provides enhanced resistance to abuse. Since the abuse layer 40 may be directly exposed to the heat seal bar of the heat-sealing equipment (not shown) when forming the sealed package 20, the abuse layer preferably provides heat-resistant characteristics to the barrier film 14 (and laminate 10) to help prevent "burn-through" during heat sealing. This is because in forming package 20 by conductance heat sealing the laminate 10 to support member 18, sealant layer 28 is placed in contact with the support member 18, while the outside layer 40 is proximate the heated bar of the heat sealing apparatus. The heat seal bar transfers heat through the outside layer 40, through laminate 10, to the sealant layer 28 to form the heat seal 44 between the laminate and support member. Accordingly, outside layer 40 may be exposed to the highest temperature during the sealing operation. Useful melting point attributes for the abuse or outside layer 40 have been discussed above.

The abuse layer 40 may include one or more of any of the following: polyolefins (e.g., polyethylenes, polypropylenes), polyamides, polyesters, polystyrenes, polyurethanes, and polycarbonates. For example, the abuse layer may include any of these polymers in an amount of at least 50 weight %, more preferably at least 70%, still more preferably at least 90%, and most preferably 100% by weight of the layer.

Examples of suitable polyesters include amorphous (co)polyesters, poly(ethylene/terephthalic acid), and poly(ethylene/naphthalate). Poly(ethylene/terephthalic acid) with at least about 75 mole percent, more preferably at least about 80 mole percent, of its mer units derived from terephthalic acid may be preferred.

Useful polyamides, polyethylenes, and polypropylenes include those described above.

The outside layer 40 may have a thickness of from about 0.05 to about 5 mils, preferably from about 0.3 to about 4 mils, and more preferably from about 0.5 to about 3.5 mils. The thickness of the outside layer may range as a percentage of the total thickness of the barrier film from about (in ascending order of preference) 1 to 50 percent, 3 to 45 percent, 5 to 40 percent, 7 to 35 percent, and 7 to 30 percent. Useful thicknesses for the outside layer include at least about any of the following values: 0.05 mils, 0.1 mils, 0.15 mils, 0.2 mils, 0.25 mils, 0.3 mils, 0.35 mils, and 0.4 mils.

Tie Layer of the Barrier Film

The barrier film 14 may include one or more tie layers, which have the primary purpose of improving the adherence of two layers of a film to each other. Tie layers may include polymers having grafted polar groups so that the polymer is capable of covalently bonding to polar polymers. Useful polymers for tie layers include ethylene/unsaturated acid copolymer, ethylene/unsaturated ester copolymer, anhydride-modified polyolefin, polyurethane, and mixtures thereof. Preferred polymers for tie layers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

The barrier film 14 may also include a tie layer directly adhered (i.e., directly adjacent) to one or both sides of an internal barrier layer. Further, a tie layer may be directly adhered to the inner (food-side) surface of the outside layer 40. The tie layers are of a sufficient thickness to provide the adherence function, as is known in the art. Each tie layer may be of a substantially similar or a different composition and/or thickness.

Inside Layer of the Barrier Film

The inside layer 38 of the barrier film 14 may provide the surface upon which a printed image (e.g., printed information) is applied, in which case the inside layer is preferably capable of providing a surface that is compatible with the selected print ink system. Further, the inside layer 38 provides the inside surface 34 to which the sealant film 12 may be directly laminated, as discussed in more detail below. The inside layer 38 may be a barrier layer.

The inside layer 38 may include any of the thermoplastics or compositions as discussed above in conjunction with the sealant layer 28 of the sealant film 12. The inside layer 38 may have a thickness of from about 0.05 to about 5 mils, preferably from about 0.1 to about 2 mils, and more preferably from about 0.2 to about 0.5 mils. The thickness of the inside layer 38 may range as a percentage of the total thickness of the barrier film 14 of from about (in ascending order of preference) 1 to 50 percent, 3 to 45 percent, 5 to 40 percent, 7 to 35 percent, and 7 to 30 percent. Useful thicknesses for the inside layer include at least about any of the following values: 0.1 mils, 0.15 mils, 0.2 mils, and 0.25 mils.

Bond Strengths of the Sealant and/or Barrier Films

The term "inter-layer bond strength" as used herein means the amount of force required to separate or delaminate two adjacent film layers by adhesive failure, as measured in accordance with ASTM F88-94 where the Instron tensile tester crosshead speed is 5 inches per second, using five, 1-inch wide, representative samples. The weakest of the inter-layer bond strength of either or both of the sealant film and barrier film may be at least about any of the following: 0.2, 0.3, 0.4, 0.5, 0.6, 0.7, 0.8, 0.9, 1, 1.5, 2, 2.5, 3, 3.5, 4, 4.5 pounds/inch.

The term "intra-layer cohesive strength" as used herein means the amount of force required to separate a film layer by cohesive failure, as measured in a direction that is perpendicular to the plane of the film and in accordance with ASTM F88-94 where the Instron tensile tester crosshead speed is 5 inches per second, using five, 1-inch wide, representative samples.

The term "intra-film cohesive strength" refers to the internal force with which a film remains intact, as measured in a direction that is perpendicular to the plane of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). In a monolayer film, intra-film cohesive strength is provided only by the intra-layer cohesion of the layer which constitutes the film. The weakest of the intra-film cohesive strength of either or both of the sealant film and barrier film may be at least about any of the following: 1, 1.5, 2, 2.5, 3, 3.5, 4, 4.5 pounds/inch.

Additives of Sealant and/or Barrier Films

One or more layers of the sealant and or barrier films of laminate 10 may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

An antifog agent may advantageously be incorporated into sealant layer 28 or coated onto sealant layer 28, because sealant layer 28 forms the inside layer adjacent the interior of the sealed package 20. The incorporation of the antifog agent may occur either before or after lamination of the barrier film to the sealant film. Suitable antifog agents may fall into classes such as esters of aliphatic alcohols, esters of polyglycol, polyethers, polyhydric alcohols, esters of polyhydric aliphatic alcohols, polyethoxylated aromatic alcohols, nonionic ethoxylates, and hydrophilic fatty acid esters. Useful antifog agents include polyoxyethylene, sorbitan monostearate, polyoxyethylene sorbitan monolaurate, polyoxyethylene monopalmitate, polyoxyethylene sorbitan tristearate, polyoxyethylene sorbitan trioleate, poly (oxypropylene), polyethoxylated fatty alcohols, polyoxyethylated 4-nonylphenol, polyhydric alcohol, propylene diol, propylene triol, and ethylene diol, monoglyceride esters of vegetable oil or animal fat, mono- and/or diglycerides such as glycerol mono- and dioleate, glyceryl stearate, monophenyl polyethoxylate, and sorbitan monolaurate. The antifog agent is incorporated in an amount effective to enhance the antifog performance of the laminate 10.

Optional Energy Treatment of the Sealant and/or Barrier Films

One or more of the thermoplastic layers of the sealant and/or barrier films—or at least a portion of the entire sealant and/or barrier films—may be cross-linked to improve the strength of the film, improve the orientation of the film, and help to avoid burn through during heat seal operations. Cross-linking may be achieved by using chemical additives or by subjecting one or more film layers to one or more energetic radiation treatments—such as ultraviolet, X-ray, gamma ray, beta ray, and high energy electron beam treatment—to induce cross-linking between molecules of the irradiated material. Useful radiation dosages include at least about any of the following: 5, 7, 10, 15, 20, 25, 30, 35, 40, 45, and 50 kGy (kiloGrey). Useful radiation dosages include less than about any of the following: 130, 120, 110, 100, 90, 80, and 70 kGy (kiloGrey). Useful radiation dosages include any of the following ranges: from 5 to 150, from 10 to 130, from 5 to 100, and from 5 to 75 kGy.

All or a portion of one or two surfaces the sealant film and/or the barrier film may be corona and/or plasma treated to change the surface energy of the film, for example, to increase the ability to print or laminate the film. One type of oxidative surface treatment involves bringing the sealant film into the proximity of an $O_2$— or $N_2$-containing gas (e.g., ambient air) which has been ionized. Exemplary techniques are described in, for example, U.S. Pat. No. 4,120,716 (Bonet) and U.S. Pat. No. 4,879,430 (Hoffinan), which are incorporated herein in their entirety by reference. The sealant film may be treated to have a surface energy of at least about 0.034 $J/m^2$, preferably at least about 0.036 $J/m^2$, more preferably at least about 0.038 $J/m^2$, and most preferably at least about 0.040 $J/m^2$.

Manufacture and Orientation of the Sealant and Barrier Films

The sealant film 12 and barrier film 14 may each be separately manufactured by thermoplastic film-forming processes known in the art (e.g., tubular or blown-film extrusion, coextrusion, extrusion coating, flat or cast film extrusion). A combination of these processes may also be employed.

Each of the sealant film 12 and barrier film 14 may be oriented (i.e., before lamination discussed below) or non-oriented. Either or both of the sealant film 12 and the barrier film 14 may be oriented in either the machine (i.e., longitudinal) or the transverse direction, or in both directions (i.e., biaxially oriented), for example, in order to enhance the optics, strength, and durability of the film. Each of the sealant and barrier films may independently be oriented in at least one direction by one of the following ratios: at least about 2.5:1, from about 2.7:1 to about 10:1, at least about 2.8:1, at least about 2.9:1, at least about 3.0:1, at least about 3.1:1, at least about 3.2:1, at least about 3.3:1, at least about 3.4:1, at least about 3.5:1, at least about 3.6:1, and at least about 3.7:1. If it is desired to reduce the heat shrink attribute of a film to a desired level after the film is oriented, then the film may be heat set or annealed after orientation.

Laminate

Laminate 10 includes sealant film 12 laminated to barrier film 14 trapping the printed image 16 between the sealant and barrier films. Inside sealant film 12 and the outside barrier film 14 have free shrink attributes. The resulting laminate 10 presents a superior appearance upon sealing to the support member 18 (as described below).

Laminate 10 also has a heat-shrink attribute which may come into effect upon exposure to the elevated temperatures associated with sealing the laminate 10 to the support member. The laminate 10 may have any of a free shrink in at least one direction (machine or transverse direction), in at least each of two directions (machine and transverse directions), or a total free shrink of at least about any of the following values: 10%, 12%, 14%, 16%, 18%, 20%, and 25% when measured at 200° F.; and at least about 21%, 23%, 25%, 30%, 35%, and 40% when measured at 240° F. It is believed that heat sealing a laminate to a support member (e.g., tray) where the laminate has free shrinks of these values at both 200° F. and 240° F. reduces the amount and size of wrinkles and/or waves that may otherwise form in the lid of the resulting sealed package.

If laminate 10 has too much heat-shrink attribute for a given support member construction, then the laminate may cause support structure 18 to bend, bow, or otherwise distort after exposure to the elevated temperatures associated with sealing the laminate 10 to the support member. Laminate 10 may have any of a free shrink in at least one direction (machine or transverse direction), in at least each of two directions (machine and transverse directions), or a total free shrink of less than about any of the following values: 70%, 60%, 50%, 40%, and 30% when measured at 200° F.; and less than about 90%, 80%, 70%, 60%, and 50% when measured at 240° F.

The thickness of the laminate may be less than about any of the following values: 10, 7, 5, 4, 3, 2.8, 2.5, 2.3, 2.2, 2.1, 2, 1.9, 1.8, and 1.7 mils. The oxygen transmission rate attributes of the laminate are discussed in the Barrier Layer section above.

Trap Printed Image

A printed image 16 is disposed (i.e., trap printed) between the sealant and barrier films at the interface between the outside surface 26 of sealant film 12 and the inside surface 34 of the barrier film 14. This may be accomplished by printing one or more images 16 on one or both of these surfaces before laminating the films together, so that upon lamination the printed images 16 are "trapped" between the two films. For example, the printed image may be "reverse trap printed" by printing the image onto surface 34 of the barrier film.

The trapped print 16 is visible through a relatively transparent barrier film to provide information to the retail purchaser of the package. Accordingly, package 10 may be provided with consumer-specific information at the time of packaging at a centralized packaging facility, in the form of a printed image trapped within the laminate 10 used at part of the sealed package 20. The availability of trap printed information in laminate 10 reduces and potentially eliminates the need for additional package printing or labeling at the retail distribution point. The printed image 16 may include indicia such as product information, nutritional information, source identification, and other information, as discussed above. The laminate may include a plurality of repeating printed images for each package (i.e., "scatter print") in which registration of the printed laminate 10 with the support member 18 is less important—or the printed image may require registration to place the printed image of the laminate in appropriate alignment with the support member 18 before sealing the lidstock to the support member (i.e., "registered print").

To form the printed image, one or more layers of ink are printed onto the print surface. The ink is selected to have acceptable ink adhesion, appearance, and heat resistance once printed on the film. The film may be printed by any suitable method, such as rotary screen, gravure, or flexographic techniques. Inks and processes for printing on plastic films are known to those of skill in the art. See, for example, Leach & Pierce, The Printing Ink Manual, (5$^{th}$ ed., Kluwer Academic Publishers, 1993), which is incorporated herein in its entirety by reference.

To improve the adhesion of the ink to the surface of the sealant or barrier film, the surface of the sealant or barrier film may be treated or modified before printing. Surface treatments and modifications include: i) mechanical treatments, such as corona treatment, plasma treatment, and flame treatment, and ii) primer treatment. Surface treatments and modifications are known to those of skill in the art. The flame treatment is less desirable for a heat-shrinkable film, since heat may prematurely shrink the film. The ink system should be capable of withstanding without diminished performance the temperature ranges to which it will be exposed during lamination, heat sealing, packaging, and end use.

Appearance Characteristics of the Laminate

Each of laminate 10 and barrier film 14 may have low haze characteristics. Haze is a measurement of the transmitted light scattered more than 2.5° from the axis of the incident light. Haze is measured against the outside surface 36 of the barrier film 40, according to the method of ASTM D 1003, which is incorporated herein in its entirety by reference. All references to "haze" values in this application are by this standard. Preferably, the haze of either laminate 10 or barrier film 14 is no more than about (in ascending order of preference) 20%, 15%, 10%, 9%, 8%, 7%, 6%, 5%, 4%, and 3%.

Laminate 10 preferably has a gloss, as measured against the outside surface 36 of the barrier film 40 of at least about (in ascending order of preference) 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle).

Preferably, laminate 10 is transparent (at least in the non-printed regions) so that the packaged food item 22 is visible through the laminate. "Transparent" as used herein means that the material transmits incident light with negligible scattering and little absorption, enabling objects (e.g., packaged food or print) to be seen clearly through the material under typical unaided viewing conditions (i.e., the expected use conditions of the material). If laminate 10 is transparent then both barrier film 14 and sealant film 12 are also transparent. Optionally, barrier film 14 may be transparent while sealant film is opaque, in which case laminate 10 is opaque while trap print 16 is still clearly visible through barrier film 14. Preferably, the transparency (i.e., clarity) of any of the laminate 10, sealant film 12, and barrier film 14 are at least about any of the following values: 65%, 70%, 75%, 80%, 85%, and 90%, as measured in accordance with ASTM D1746.

Modulus of the Laminate

Laminate 10 preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. Each of the sealant film 12, barrier film 14, and/or laminate 10 may have a Young's modulus of at least about any of the following: 70,000, 80,000, 90,000, 100,000, 150,000, 200,000, 250,000, 300,000, 350,000 pounds/square inch, measured at a temperature of 73° F. A higher modulus film has an enhanced stiffness, which may help reduce the tendency of the trap printed image 16 to crack when the laminate is flexed. Further, it is helpful that barrier film 12 have a high modulus at the elevated temperatures present when the laminate 10 is exposed to heat seal temperatures, for example, during the lidstock sealing process discussed below. Accordingly, the Young's modulus of the barrier film 14 may be greater than the modulus of the sealant film 12, for example, greater by at least about one of the following amounts: 25%, 30%, 35%, 40%, 45%, 50%, 60%, 70%, 75%, 80%, 90%, 100%, 125%, 150%, 175%, 200%, 400%, and 600%.

Manufacture of the Laminate

To manufacture laminate 10, the outside surface 26 of the sealant film 12 is placed adjacent to or in contact with the inside surface 34 of barrier film 14 so that the films may be bonded together by a suitable lamination technique. Suitable lamination techniques are known in the art, and include adhesive bonding, reactive surface modification (e.g., corona treatment, flame treatment, or plasma treatment), heat treatment, pressure treatment, heat-welding, and combinations thereof. Suitable lamination methods are described in U.S. Pat. No. 5,779,050 issued Jul. 14, 1998 to Kocher et al entitled "Lidded Package Having a Tab to Facilitate Peeling," which is incorporated herein in its entirety by reference.

Barrier film 14 may be directly laminated to sealant film 12. The term "directly laminated" as used herein means that a first film is bonded to a second film by a suitable lamination method without an additional film between the first and second films. The first film (e.g., sealant film) may be considered as "directly laminated" to the second film (e.g., barrier film)—even if additional material is present between the first and second films—if the additional material is present primarily to facilitate the lamination of the first and second films (e.g., an adhesive used in adhesive lamination)

or to form part of the trap print (e.g., a printed image) between the first and second films.

Laminate 10 has an inter-film bond strength sufficient to survive the expected packaging and end use conditions without delamination. The term "inter-film bond strength" as used herein means the amount of force required to separate or delaminate two directly laminated films, as measured in accordance with ASTM F88-94 where the Instron tensile tester crosshead speed is 5 inches per second, using five, 1-inch wide, representative samples. Preferably, the inter-film bond strength between sealant film 12 and barrier film 14 is at least about any of the following values: 0.5, 0.7, 0.9, 1, 1.1, 1.2, 1.3, 1.4, 1.5, 1.7, 2, and 2.5 pounds/inch.

As a reactive surface modification lamination method, corona treatment may be combined with pressure and, optionally, heat immediately after the corona treatment. The corona treatment provides the film with a reactively modified surface to enhance lamination bonding. The amount of corona discharge to which the films are exposed is directly proportional to the amount of power supplied to the corona treatment units, and also indirectly proportional to the speed at which the films are passed through the units. In general, corona treatment units operate by passing a high voltage electrical current through an electrode positioned adjacent a film surface to be treated. The electrode then produces an electrical discharge which ionizes the surrounding air to cause reactive surface modification, e.g., oxidation, of the treated film surface.

Any desired combination of power input to the corona unit and film speed may be employed to achieve a desired bond-strength between the films. The amount of power to supplied to the corona treatment units may range, for example, from about 0.02 to about 0.5 kilowatts (kw) per inch of film width. The film speed through the corona treatment unit may range, for example, from about 10 to about 2000 feet/minute.

Alternatively or in addition to a reactive surface modification lamination method, heat-welding may be employed to laminate the films together. For example, skin layer 30 of sealant film 12 and inside layer 38 of barrier film 14 may comprise materials capable of forming a heat-weld bond during lamination. Suitable materials for the interfacing layers for a heat-weld lamination were discussed above in conjunction with the sealant layer of the sealant film. The same or different thermoplastics may be included in the adjacent film layers.

In order to facilitate fast and reliable sealing of the lidstock laminate 10 to the support member, it is preferable that laminate 10 has good hot tack attributes. The term "hot tack" is understood to those of skill in the art. Preferably, laminate 10 has a hot tack strength of at least 2 Newtons, more preferably at least about 4 Newtons.

Sealed Package

The lidstock laminate 10 may be heat sealed to support member 18 to form sealed package 20.

Support Member

Support member 18 is a component of package 20 in addition to laminate 10. Product 22 (e.g., a food product) may be disposed on or in support member 18. For example, meat products may be disposed in a tray-like support member comprising, for example, expanded polystyrene sheet material that has been thermoformed into a desired shape for supporting the meat product. Product support member 18 preferably is in the form of a tray having side walls 50 and base 52—which define cavity 46 into which the product 22 may be disposed. A peripheral flange 48 preferably extends from side walls 50 to provide a sealing surface for attachment of lid 10 to the support member 18 to enclose the product 22 within the cavity 46.

Although the drawings show support member 18 in one configuration, support member 18 may have any desired configuration or shape, such as rectangular, round, or oval. The support member may be substantially rigid, semi-rigid, or flexible. For example, the support member may have a 1% secant flex modulus of at least about any of the following values: 120,000, 140,000, 160,000, 180,000, 200,000, and 225,000 pounds/square inch.

Flange 48 may also have any desired shape or design, such as the substantially flat design presenting a single sealing surface as shown in the drawings, or a more elaborate design which presents two or more sealing surfaces, such as the flange configurations disclosed in U.S. Pat. Nos. 5,348,752 and 5,439,132, the disclosures of which are incorporated herein by reference.

Support member 18 may be formed from any material useful for the expected end use conditions, including polyvinyl chloride, polyethylene terephthalate, polystyrene, polyolefins (e.g., high density polyethylene or polypropylene), paper pulp, nylon, and polyurethane. The support member may be foamed or non-foamed as desired. Support member 18 may have oxygen transmission barrier attributes, particularly when product 22 is an oxygen-sensitive food product. When such oxygen-sensitive products are to be packaged in a modified atmosphere environment to extend either bloom-color life or shelf-life, support member 18 preferably has a thickness and composition sufficient to provide an oxygen transmission rate of no more than about any of the following values: 1000, 500, 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C.

To achieve oxygen barrier attributes, support member 18 may comprise one or more of the barrier components discussed above in the Barrier Layer section in order to provide oxygen barrier attributes to the support member. Such barrier components may be incorporated within structural sections or aspects of the support member—or optionally incorporated in a surface layer or film 54 laminated or otherwise bonded to form the inside surface of the support member, as described in U.S. Pat. Nos. 4,847,148 and 4,935,089, and in U.S. Ser. No. 08/326,176, filed Oct. 19, 1994 and entitled "Film/Substrate Composite Material" (published as EP 707 955 A1 on Apr. 24, 1996), each of which is incorporated herein in its entirety by reference.

In addition to (or as an alternative to) providing oxygen barrier attributes, the surface layer or film 54 may enhance the sealability of the lidstock laminate 10 to the support member 18. In heat sealing laminate 10 to the support member 18, layer or film 54 of the support member contacts and melds with sealant layer 28 of the sealant film 12 to form heat seal 44. To facilitate a strong heat seal 44, layer or film 54 may comprise one or more thermoplastics that are compatible with the thermoplastic composition of the sealant layer 28. Accordingly, layer or film 54 may comprise any of the polymer compositions and thicknesses as discussed in the Sealant Layer and Skin Layer sections regarding sealant film 12. The outer surface of layer or film 54 may comprise polymer having a melting point or softening point essentially equivalent to or less than that of the polymer forming surface 24 of sealing layer 28, for example, less by about any of the following values: 5° F., 10° F., 15° F., 20° F.

It was discovered that a strong bond between the laminate 10 and support member 18 may be formed where the melting point of the polymer forming the surface of layer 54 is higher than the melting point of the polymer forming the surface 24 of sealant layer 28—for example, a bond stronger than that formed where the melting point of the polymer forming the surface of layer 54 was lower than the melting point of the polymer forming the surface of sealant layer 28.

It is believed that the result of the stronger bond with a relatively higher melting point surface layer 54 was facilitated where the melt-flow index of the surface layer 54 was lower than the melt-flow index of the sealant layer 28 of the sealant film. Accordingly, the melt-flow index of the polymer forming surface layer 54 may be lower than the melt-flow index of the polymer forming the surface 24 of sealant layer 28, for example lower by at least about any of the following values: 0.2, 0.5, 0.7, 1, 1.4, 1.6, 1.8, 2, 2.2, 2.5, 2.8, 3, 3.5, and 4 g/10 minutes.

As previously discussed, the sealant layer 28 may comprise one or more polymers. There is inherently a highest temperature above which the melting point or softening point of at least 70 weight % of the one or more polymers of the sealant layer exists. Similarly, there are such highest temperatures for other such selected weight percentages, such as 80, 90, and 100%. The sealing area of the outer surface of the support member or layer 54 may comprise any of at least about 70, 80, 90, or 100 weight % of one or more polymers each having a melting point or softening point at least about any of 3° F., 5° F., 7° F., 10° F., 15° F., 30° F., or 35° F. higher than such highest temperature.

Manufacture of the Sealed Package

To make sealed package 20, the item to be packaged (e.g., product 22) may be placed onto support member 18. Then laminate 10 is placed over the support member so that the sealant film 12 of the laminate contacts the support member 18. Laminate 10 may be supplied from a larger web of the laminate, for example, from a roll that is unwound to supply laminate as needed.

A heated bar or member engages the perimeter of the lid 10 corresponding with the perimeter flange 48 of the support member to compress the lid against the flange of the support member. The resulting heat transfer and compression causes the sealant layer 28 of the lid and surface layer 54 of the support member to soften and intermix with one another. The heat from the sealing operation may also initiate shrinking of the heat shrinkable laminate to reduce the amount of wrinkles or waves that may otherwise form in the lid. The excess lid material extending beyond the flange may be trimmed by a cutting operation. Further, if the laminate is supplied from a roll, portions may be severed from the web after or simultaneously with the heat-welding of the laminate to support member 18. Laminate 10 may be severed by a conventional cutting device (e.g., a sharp cutting instrument or a thermal cutting device such as a heated wire or heated blade). The heating bar is removed to allow the sealed area to cool and form a sealed bond. A representative process for heat sealing a lid to a support member is described in U.S. Pat. No. 5,779,050 to Kocher, which was previously incorporated by reference.

The resulting heat-weld or heat-seal 44 preferably extends continuously around the upper surface of flange 48 to hermetically seal or enclose product 22 within package 20.

In this manner, laminate 10 and support member 18 preferably form a substantially gas-impermeable enclosure for product 22 to protect it from contact with the surrounding environment including, atmospheric oxygen, dirt, dust, moisture, liquid, and microbial contaminates. Product 22 may be packaged in a modified atmosphere where product 22 is oxygen-sensitive (i.e., perishable, degradable, or otherwise changeable in the presence of oxygen) in order to extend the shelf life or bloom-color life. Such oxygen-sensitive products include fresh red meat products (e.g., beef, veal, lamb, and pork), poultry, fish, and cheese.

The sealing of the laminate 10 to support member 18 may be by one or more of the heat sealing methods, including thermal conductance sealing (as described above), impulse sealing, ultrasonic sealing, and dielectric sealing.

Product 22 is shown as a "low profile" product—that is, a product having a maximum height that is below the maximum height of support member 18 (i.e., the level at which flange 48 is located). However, a "high profile" product—that is, a product having a maximum height that is above the maximum height of support member 18—may also be packaged in accordance with the present invention so that the portion of the product which extends above the level of flange 48 will be in contact with lid 10.

Seal Strength

The resulting heat seal bond 44 between the laminate 10 and the support 18 is sufficiently strong to withstand the expected use conditions. For example, the heat seal bond strength may be at least about any of the following values: 0.5, 0.6, 0.7, 0.8, 0.9. 1, 1.3, 1.5, 1.8, 2, 2.5, 3, 3.5, 4, 4.5, 5, 5.5, 6, 6.5, 7, 7.5, and 8 pound/inch. The term "heat seal bond strength" as used herein means the amount of force required to separate the sealant layer of the laminate from the support member to which the sealant layer has been sealed, as measured in accordance with ASTM F88-94 where the Instron tensile tester crosshead speed is 5 inches per second, using five, 1-inch wide, representative samples.

Preferably, the weakest point of any of the inter-layer bond strength of the sealant film, the inter-layer bond strength of the barrier film, the intra-layer cohesive strength of the layers of the sealant and barrier films, and the inter-film bond strength is located from the inside surface 24 of the sealant film by a distance of at least about any of the following values: 0.4, 0.5, 0.6, 0.7, 0.8, 0.9, 1, 1.1, 1.2 mils.

Further, the resulting sealed packaged also has a seal strength sufficient to withstand the expected end use conditions, for example, a seal strength of at least about any of the following values: 3, 3.5, 4, 4.5, 5, 5.5, 6, 6.5, 7, and 7.5 pounds/inch. The term "seal strength" in conjunction with a sealed package refers to the maximum amount of force required to cause a cohesive or adhesive failure either within laminate that is sealed to the support member, in the bond between the laminate and the support member of the package, or in the support member itself, measured in accordance with ASTM F88-94 by pulling representative samples of the film or laminate sealed to the support member using an Instron tensile tester with a crosshead speed of 5 inches per second and averaging the results from five, 1-inch wide, representative samples. ASTM F88-94 is incorporated herein in its entirety by reference.

As used herein, an "adhesive failure" is a failure in which the interfacial forces (e.g., valence forces or interlocking action or both) holding two surfaces together are overcome. A "cohesive failure" is one in which the molecular attractive forces holding together a layer composition are overcome.

Preferably, each of the sealed package 20, laminate 10, and the films incorporated in laminate 10 (e.g., sealant film 12 and barrier film 14) are non-peelable. The term "non-peelable" used in conjunction with a sealed package, laminate, or film means that the seal strength failure mode results in a jagged, tattered, or ragged separation—that is, one that does not cleanly, consistently, or reliably fail in the same manner and along the same position each time. In this sense, the seal strength failure mode of a non-peelable film or laminate is contrary to that of a peelable film, which is specifically designed to fail cleanly, consistently, and reliably in the same manner and along the same relative position each time, for example by incorporation of non-compatible thermoplastics and/or contaminates in two adjacent film layers to facilitate peeling and also by incorporating a mechanism such as a tab to initiate a peel separation, as described in U.S. Pat. No. 5,919,547 issued Jul. 6, 1999 to Kocher entitled "Laminate Having a Coextruded, Multilayer Film Which Delaminates and Package Made Therefrom," which is incorporated herein in its entirety by reference.

The following examples are presented for the purpose of further illustrating and explaining the present invention and are not to be taken as limiting in any regard.

EXAMPLES

In the comparatives and examples below, the following materials were used:

"Additives" are 5% antifog additives and 2% antiblock additives;

"Adhesive 1" is a methylene bis(phenyl isocyanate), an ethyl ester of acetic acid and a polyol curing agent;

"EPC" is a propylene-ethylene copolymer with 3.3% ethylene content and a melting point of 139° C. available from ExxonMobil under the trademark Escorene PD9302;

"EVOH1" is an ethylene/vinyl alcohol copolymer having 44 mole % ethylene content, a melt flow index of 1.6, and a melting point of 165° C.;

"ION" is an ionomer resin modified with nylon available from DuPont Corporation under the trademark SURLYN AM 7927;

"LLDPE1" is a heterogeneous ethylene/octene copolymer having a melt-flow index of 1.0 and a density of 0.920 g/cc, available from the Dow Chemical Company (Midland, Mich.) under the DOWLEX 2045 trademark;

"LMDPE" is a heterogeneous ethylene/octene copolymer having an octene content of 2.5 weight %, a melt-flow index of 2.5, and a density of 0.935 g/cc, available from the Dow Chemical Company (Midland, Mich.) under the DOWLEX 2037 trademark;

"MB" is a masterbatch of 90.3% polypropylene homopolymer (ESCORENE PD4062 available from ExxonMobil), 4% inorganic antiblock, and 5.7% slip and antiblock agents;

"MPE" is a homogeneous ethylene/hexene/butene terpolymer having a melt flow index of 2.0 and a density of 0.902 g/cc, available from ExxonMobil Corporation under the EXACT 9103 trademark;

"Nylon1" is a nylon 6/66 copolymer having a melting point of 196° C.;

"Nylon2" is a nylon 6/12 copolymer having a melting point of 130° C.; and

"Tie 1" is an anhydride-grafted LLDPE.

Example 1

A trap-printed laminate having the composition and construction shown in Table 1 was formed by adhesively laminating a First Film (i.e., shrink sealant film) to a Second Film (i.e., shrink barrier film) having a printed image on its inside surface. The Example 1 laminate had a total thickness of 1.85 mils. The films used to form the Example 1 laminate and the resulting Example 1 laminate itself had the free shrinks as reported in Table 2. The sealant layer side of the Example 1 laminate was heat sealed to a plastic tray (commercially available from Cryovac Inc. under the tradename CS977) to form a sealed package. The lid of the resulting package was free from visible wrinkles, film corrugations, and waves to present a tight, wrinkle-free appearance.

TABLE 1

| Film Designation | Layer Designation (Function) | Layer Composition (weight %) | Thickness of Layer (mils) |
| --- | --- | --- | --- |
| First Film | First (inside or sealant layer) | 93% MPE; 7% Additives | 0.2 |
| | Second | 70% LLDPE1; 23% LMDPE; 7% Additives | 0.2 |
| | Third | 50% LLDPE1; 50% LMDPE | 0.5 |
| | Fourth (outside, skin) | 70% LLDPE1; 23% LMDPE; 7% Additives | 0.1 |
| | Lamination adhesive | Adhesive1 | 0.1 |
| Second Film | First (skin layer) | 95% EPC; 5% MB | 0.2 |
| | Second (tie) | Tie1 | 0.07 |
| | Third (bulk, barrier protection) | 80% Nylon1; 20% ION | 0.07 |
| | Fourth (barrier) | 90% EVOH1; 10% Nylon2 | 0.07 |
| | Fifth (bulk, barrier protection) | 80% Nylon1; 20% ION | 0.07 |
| | Sixth (tie) | Tie1 | 0.07 |
| | Seventh (skin layer) | 95% EPC; 5% MB | 0.2 |

TABLE 2

| | | Shrink (%) | | | |
| --- | --- | --- | --- | --- | --- |
| | | Example 1 | | Comparative 1 | |
| Film/Laminate | Direction of Shrink | 200° F. | 240° F. | 200° F. | 240° F. |
| 1st (sealant) | Machine | 9 | 48 | 9 | 48 |
| | Transverse | 18 | 53 | 18 | 53 |
| 2nd (barrier) | Machine | 16 | 31 | 5 | 16 |
| | Transverse | 17 | 34 | 3 | 13 |
| Laminate | Machine | 11 | 30 | 8 | 17 |
| | Transverse | 16 | 35 | 9 | 20 |
| Shrink Ratio of 2nd Film to 1st Film | Machine | 1.78 | 0.65 | 0.56 | 0.33 |
| | Transverse | 0.94 | 0.64 | 0.17 | 0.25 |

Comparative 1

A trap-printed laminate having the composition and construction shown in Table 3 was formed by adhesively laminating a First Film (i.e., the same film as used in Example 1) to a Second Film having a printed image on its inside surface. The Second Film is a biaxially oriented three-layer coextrusion commercially available from Unitika Ltd. (Osaka, Japan) under the EMBLON E801-15 trademark. The Second Film is 0.6 mils thick and is believed to comprise about 66% nylon and 34% ethylene/vinyl alcohol copolymer, as represented in Table 3. The Comparative 1 laminate had a total thickness of about 1.7 mils. The films used to form the Comparative 1 laminate and the resulting laminate had the free shrinks as reported in Table 2. The sealant layer side of the Comparative 1 laminate was heat sealed to the same tray as described above for Example 1 under the same sealing conditions as Example 1 to form a sealed package. The lid of the resulting Comparative package had waves and wrinkles in the form of film corrugations along the sealing edge of the lid at the leading and trailing edges of the package.

TABLE 3

| Film Designation | Layer Designation (Function) | Layer Composition (weight %) | Thickness of Layer (mils) |
| --- | --- | --- | --- |
| First Film | First (inside or sealant layer) | 93% MPE; 7% Additives | 0.2 |
|  | Second | 70% LLDPE1; 23% LMDPE; 7% Additives | 0.2 |
|  | Third | 50% LLDPE1; 50% LMDPE | 0.5 |
|  | Fourth (outside, skin) | 70% LLDPE1; 23% LMDPE; 7% Additives | 0.1 |
| Second Film | Lamination adhesive | Adhesive1 | 0.1 |
|  | First (skin layer) | polyamide (nylon) |  |
|  | Second (barrier) | ethylene vinyl alcohol |  |
|  | Third (skin layer) | polyamide (nylon) |  |

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. All parts and percentages are by weight, unless otherwise indicated or well understood in the art. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by reference.

What is claimed is:

1. A method of forming a package comprising:
   a) providing a laminate comprising:
      a first film having an inside surface and an outside surface opposite the inside surface of the first film, the first film comprising a sealant layer forming the inside surface of the first film, the sealant layer comprising one or more polymers each having a given melting point, whereby at least one polymer of the sealant layer has the lowest melting point of the one or more polymers in the sealant layer;
      a second film having an inside surface and an outside surface opposite the inside surface, the second film comprising an outside layer forming the outside surface of the second film, the outside layer comprising at least about 40% by weight of the outside layer of one or more relatively high-melt polymers each having a melting point at least about 25° F. higher than the lowest melting point polymer of the sealant layer; and a printed image between the first and second films, wherein:
      the first film has an oxygen transmission rate greater than the oxygen transmission rate of the second film, measured (at standard temperature and pressure) per square meter per day per 1 atmosphere of oxygen pressure differential measured at 0% relative humidity and 23° C.;
      the laminate has an oxygen transmission rate of no more than about 100 cubic centimeters (at standard temperature and pressure) per square meter per day per 1 atmosphere of oxygen pressure differential measured at 0% relative humidity and 23°C.;
      the laminate has a free shrink in each of the transverse and machine directions of at least about 10% at 200° F. and at least about 21% at 240° F.; and
   b) heat sealing the laminate to a support member to form a closed packages, wherein the inside surface of the first film is adjacent the interior of the closed package.

2. The method of claim 1 wherein the provided laminate has a free shrink in the transverse direction of at least about 12% at 200° F. and at least about 23% at 240° F.

3. The method of claim 1 wherein the provided laminate has a free shrink in the transverse direction of at least about 14% at 200° F. and at least about 25% at 240° F.

4. The method of claim 1 wherein the provided laminate has a free shrink in the transverse direction of at least about 16% at 200° F. and at least about 30% at 240° F.

5. The method of claim 1 wherein the provided laminate has a free shrink in the machine direction of at least about 11% at 200° F. and at least about 30% at 240° F. and a free shrink in the transverse direction of at least about 16% at 200° F. and at least 35% at 240° F.

6. The method of claim 1 wherein the free shrink values of the second film of the provided laminate measured at each of 200° F. and 240° F. in each of the machine and transverse directions are from about 0.3 to about 3 times the free shrink values of the first film of the provided laminate measured at the corresponding temperature and direction.

7. The method of claim 1 wherein the free shrink values of the second film of the provided laminate measured at each of 200° F. and 240° F. in each of the machine and transverse directions are from about 0.5 to about 3 times the free shrink values of the first film of the provided laminate measured at the corresponding temperature and direction.

8. The method of claim 1 wherein the free shrink values of the second film of the provided laminate measured at each of 200° F. and 240° F. in each of the machine and transverse directions are from about 0.6 to about 2.5 times the free shrink values of the first film of the provided laminate measured at the corresponding temperature and direction.

9. The method of claim 1 wherein the free shrink values of the second film of the provided laminate measured at each of 200° F. and 240° F. in each of the machine and transverse directions are from about 0.6 to about 2 times the free shrink values of the first film of the provided laminate measured at the corresponding temperature and direction.

10. A package formed by the method of claim 1.

11. The method of claim 1 wherein the outside layer comprises at least about 60% by weight of the outside layer of the one or more relatively high-melt polymers.

12. The method of claim 1 further comprising placing a food product on the support member before heat sealing the laminate to the support member to enclose the food product in the package.

13. The method of claim 1 wherein the laminate has an oxygen transmission rate of no more than about 50 cubic centimeters (at standard temperature and pressure) per square meter per day per 1 atmosphere of oxygen pressure differential measured at 0% relative humidity and 23° C.

14. The method of claim 1 wherein the sealant layer comprises at least 30% based on the weight of the sealant layer of a polymer having a melting point of less than about 115° C.

15. The method of claim 1 wherein the first film is un-perforated.

16. The method of claim 1 wherein the second film has an oxygen transmission rate of no more than about 30 cubic centimeters (at standard temperature and pressure) per square meter per day per 1 atmosphere of oxygen pressure differential measured at 0% relative humidity and 23° C.

17. The method of claim 1 wherein the image is printed on the inside surface of the second film.

18. The method of claim 1 wherein the second film has a Young's modulus of at least about 150,000 pounds/square inch.

19. The method of claim 1 wherein the thickness of the first film is greater than or equal to the thickness of the second film.

20. The method of claim 1 wherein each inter-layer bond strength of the first film of the provided laminate is at least 2.5 pound/inch.

21. The method of claim 1 wherein the closed package has a seal strength of at least about 5 pounds/inch.

22. The method of claim 1 wherein the closed package has a seal strength of at least about 6 pounds/inch.

23. The method of claim 1 wherein the provided laminate is non-peelable.

24. The method of claim 1 wherein the sealant film of the provided laminate is non-peelable.

25. The method of claim 1 wherein the support member comprises a rigid tray.

26. The method of claim 1 wherein the sealant layer of the first film of the provided laminate comprises one or more polymers, whereby there is a highest temperature above which the melting point of at least 70 weight % of the one or more polymers of the sealant layer exists; and the support member comprises a sealing area to which the laminate is sealed, the sealing area of the support member comprising at least about 70 weight % of one or more polymers each having a melting point at least about 3° F. higher than said highest temperature.

27. The method of claim 26 wherein the at least about 70 weight % of one or more polymers of the sealing area each has a melting point at least about 7° F. higher than said highest temperature.

28. The method of claim 1 wherein sealing the laminate to the support member encloses within the package interior oxygen concentration different from that of ambient air.

* * * * *

UNITED STATES PATENT AND TRADEMARK OFFICE
CERTIFICATE OF CORRECTION

PATENT NO. : 6,769,227 B2
DATED : August 3, 2004
INVENTOR(S) : Mumpower et al.

It is certified that error appears in the above-identified patent and that said Letters Patent is hereby corrected as shown below:

Column 28,
Line 24, "packages" should be -- package --.

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,769,227 B2
DATED : August 3, 2004
INVENTOR(S) : Mumpower et al.

It is certified that error appears in the above-identified patent and that said Letters Patent is hereby corrected as shown below:

Column 10,
Line 58, "Carrier Film" should be -- Barrier Film --.

Signed and Sealed this

Twenty-seventh Day of December, 2005

JON W. DUDAS
*Director of the United States Patent and Trademark Office*